United States Patent
Smashey et al.

[11] Patent Number: 5,785,775
[45] Date of Patent: Jul. 28, 1998

[54] WELDING OF GAMMA TITANIUM ALUMINIDE ALLOYS

[75] Inventors: Russell W. Smashey, Loveland; Thomas J. Kelly, Cincinnati; John H. Snyder, Fairfield; Ronald L. Sheranko, Cincinnati, all of Ohio

[73] Assignee: General Electric Company, Cincinnati, Ohio

[21] Appl. No.: 785,408

[22] Filed: Jan. 22, 1997

[51] Int. Cl.$^6$ ............................................. C22F 1/18
[52] U.S. Cl. .................... 148/669; 148/527; 228/262.71
[58] Field of Search ............................. 148/669, 670, 148/671, 527; 228/262.71

[56] References Cited

U.S. PATENT DOCUMENTS

| | | | |
|---|---|---|---|
| 3,980,220 | 9/1976 | Wolfe et al. | 228/262.71 |
| 4,503,314 | 3/1985 | Kakimi et al. | 219/121 |
| 4,893,743 | 1/1990 | Eylon et al. | 228/181 |
| 4,982,893 | 1/1991 | Ruckle et al. | 148/527 |
| 5,106,010 | 4/1992 | Stueber et al. | 228/232 |
| 5,170,027 | 12/1992 | Brodersen | 219/72 |
| 5,185,513 | 2/1993 | Pacileo | 219/497 |
| 5,319,179 | 6/1994 | Joecks et al. | 219/137 |
| 5,372,297 | 12/1994 | Bay et al. | 118/262.71 |
| 5,374,319 | 12/1994 | Stueber et al. | 148/404 |
| 5,415,336 | 5/1995 | Stennard et al. | 228/193 |
| 5,431,752 | 7/1995 | Brogle et al. | 148/516 |
| 5,453,243 | 9/1995 | Hansen et al. | 419/45 |

*Primary Examiner*—John Sheehan
*Attorney, Agent, or Firm*—Andrew C. Hess; David L. Narciso

[57] ABSTRACT

An article made of a gamma titanium aluminide alloy is welded, as for example in the weld repair of surface cracks, by removing foreign matter from the area to be welded, first stress relieving the article, cooling the entire article to a welding temperature of from about 1000° F. to about 1400° F., welding a preselected region in an inert atmosphere at the welding temperature, and second stress relieving the article. Welding is preferably accomplished by striking an arc in the preselected region so as to locally melt the alloy in the preselected region, providing a filler metal having the same composition as the gamma titanium aluminide alloy of the article, and feeding the filler metal into the arc so that the filler metal is melted and fused with the article to form a weldment upon solidification.

19 Claims, 3 Drawing Sheets

WELDING OF GAMMA TITANIUM ALUMINIDE ALLOYS

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to welding, and, more particularly, to the welding of gamma titanium aluminide alloys.

Titanium aluminides are a class of alloys whose compositions include at least titanium and aluminum, and typically some additional alloying elements such as chromium, niobium, vanadium, tantalum, manganese, or boron. The gamma titanium aluminides are based on the gamma phase found at nearly the equiatomic composition, with roughly 50 atomic percent each of titanium and aluminum, or slightly reduced amounts to permit the use of other alloying elements. The titanium aluminides, and particularly the gamma titanium aluminides, have the advantages of low density, good low and intermediate temperature strength and cyclic deformation resistance, and good environmental resistance.

Gamma titanium aluminides can be used in aircraft engines. They potentially have applications such as low-pressure turbine blades and vanes, bearing supports, compressor casings, high pressure and low pressure hangars, frames, and low pressure turbine brush seal supports. They may also have application in other products such as automotive valves and superchargers.

Articles made of gamma titanium aluminide alloys are usually consumable arc melted into a mold, with investment casting being the most popular approach, hot isostatically processed (HIPPED) and then further processed. The as-cast articles sometimes have surface crack defects such as hot tears and surface-connected porosity due to shrinkage defects. These surface defects are deleterious to the properties of the article, either directly or by preventing the closure of interior porosity and shrinkage cavities during subsequent processing.

If the surface defects are not too severe, as is often the case, they may be repaired. However, the inventors have recognized that existing repair techniques are not fully successful in removing the surface defects. There is accordingly a need for an improved technique for repairing surface defects in titanium gamma aluminide articles. The present invention fulfills this need, and further provides related advantages.

SUMMARY OF THE INVENTION

The present invention provides a welding technique for gamma titanium aluminide articles. The approach may be used for weld repair of defects such as surface cracks on a single gamma titanium aluminide article, or for joining of two gamma titanium aluminide articles together. Care is taken in the welding procedure to avoid a material state wherein the existing defects propagate further into the structure and so that new defects are not formed.

In accordance with the invention, a method of welding a gamma titanium aluminide alloy comprises the steps of furnishing an article made of a gamma titanium aluminide alloy, removing any foreign matter present in a preselected region of the article to be welded, preferably first stress relieving the article at a temperature above the welding temperature, stabilizing the temperature of the article at the welding temperature, welding the preselected region of the article, in an inert atmosphere, at the welding temperature, and preferably second stress relieving the article at a temperature above the welding temperature. The welding temperature is from about 1000° F. to about 1400° F., most preferably about 1200° F.

It is strongly preferred to stress relieve the article both before heating the article to the welding temperature and after welding is complete. Stress relieving is preferably accomplished at a temperature of from about 1700° F. to about 2100° F., most preferably about 1800° F. The stress relieving inhibits, and desirably prevents, the propagation of pre-existing cracks and inhibits, and desirably prevents creation of further surface cracking due to the welding procedure.

The approach may be used with articles made of any gamma titanium aluminide alloy, but an alloy having a composition, in atomic percent, of 48 percent aluminum, 2 percent chromium, 2 percent niobium, balance titanium is preferred.

The welding is preferably accomplished by striking an arc in the preselected region so as to locally melt the alloy in the preselected region, providing a weldment metal, most preferably having the same composition as the gamma titanium aluminide alloy of the article, feeding the weldment metal into the arc so that the weldment metal is melted and fused with the article, and thereafter cooling the welded article. This approach may be used either to accomplish weld repair of a single article, or to join together two articles.

A different approach to welding gamma titanium aluminide articles is required, as compared with more-commonly encountered low-alloy titanium-base metals such as Ti-6Al-4V. The gamma titanium aluminide alloys have substantially less ductility than the low-alloy titanium-base metals. This low ductility results in a more crack-prone metal, so that cracks are more likely to be formed during casting and other processing operations. Even though care is taken to minimize the incidence of cracking, cracks are often present in, or result from, current processing operations. Thus, even conventional techniques designed to remove cracks, such as weld repair, can cause even more cracks when they are used with gamma titanium aluminide alloys. Brazing procedures using low-melting-point alloys are satisfactory for repair and joining in some applications, but not in others.

The present approach provides a technique where care is taken to accomplish the welding, for either repair or joining purposes, so that existing cracks do not further propagate and so that new cracks are not introduced and propagated. Any such cracks act as failure initiation points and may inhibit subsequent hot isostatic pressing to remove interior porosity. The resulting article is therefore sounder and of better mechanical properties than can be achieved using other repair or welding techniques.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

3

Figure 1:
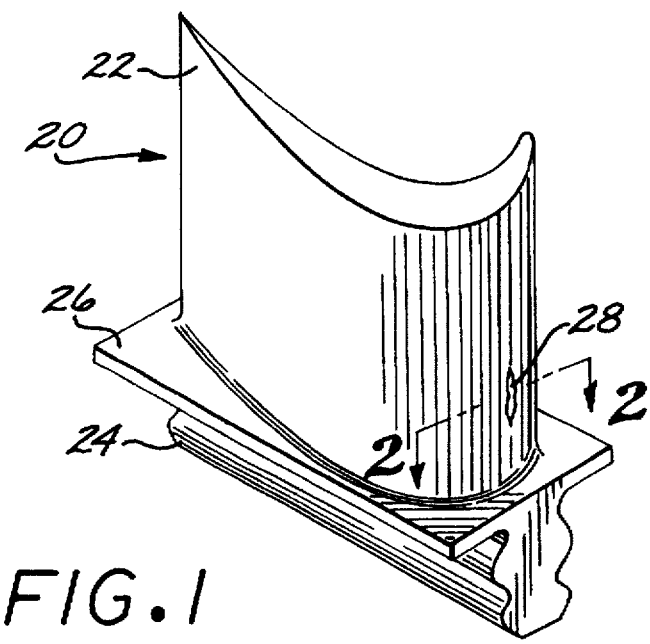
FIG. 1 is a perspective view of a gas turbine blade article.
Figure 2:
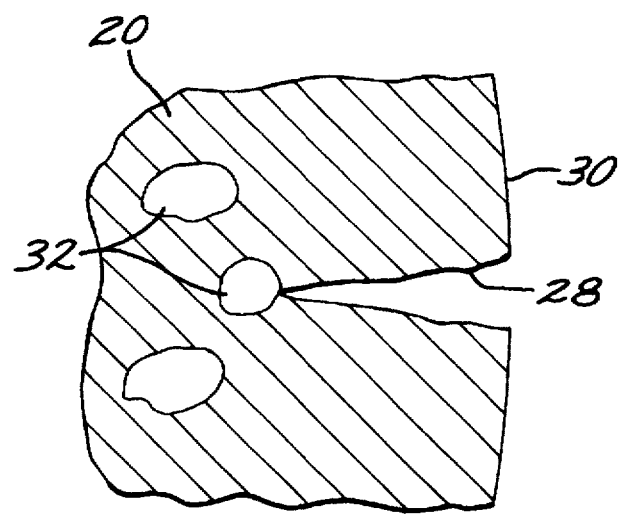
FIG. 2 is an enlarged sectional view through the article of FIG. 1, taken generally along line 2—2.
Figure 3:
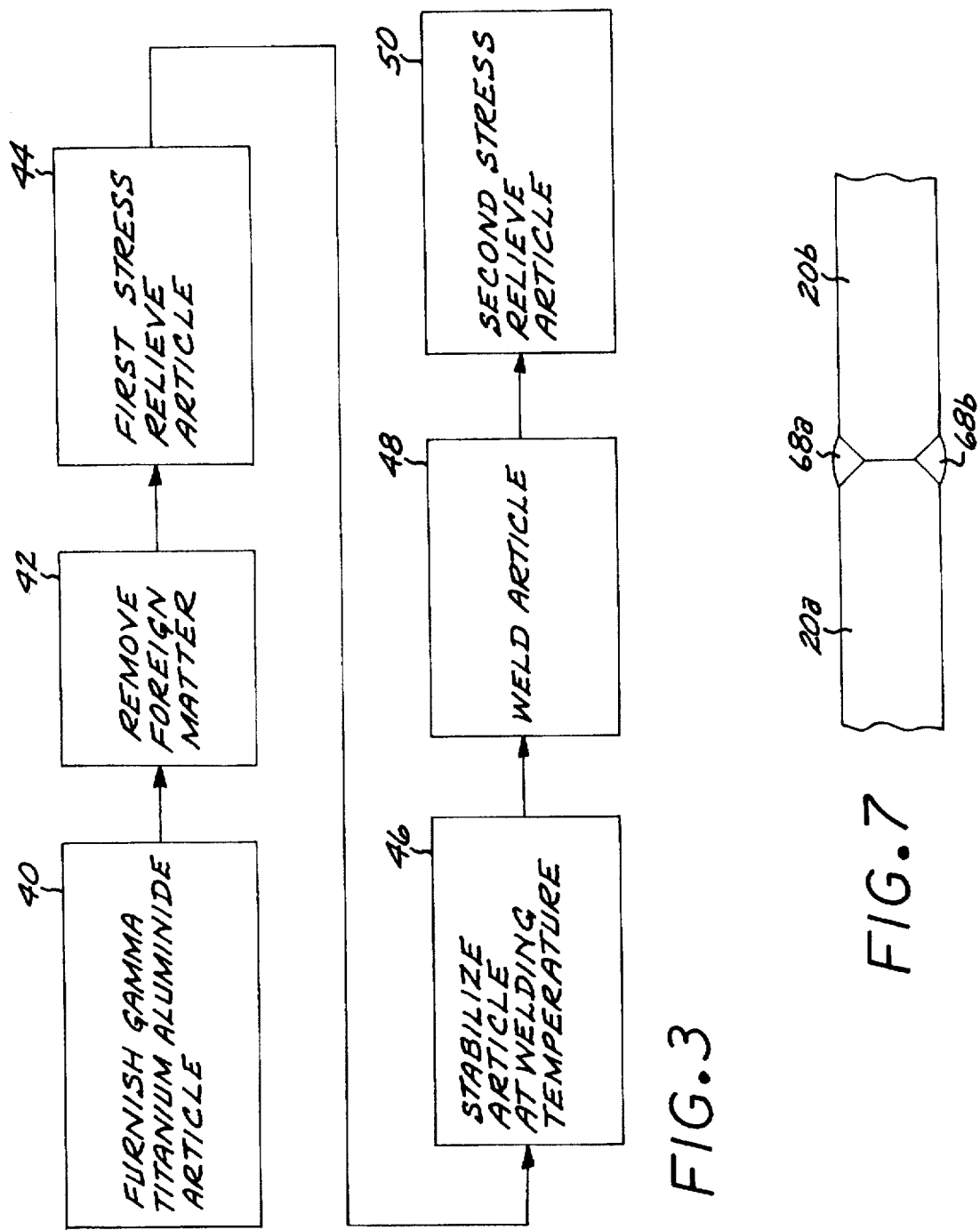
Figure 4:
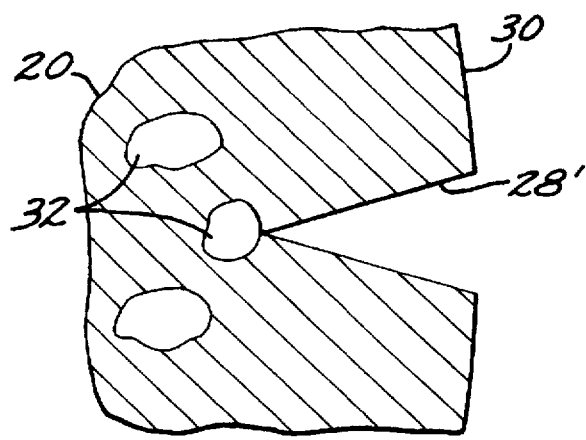
Figure 5:
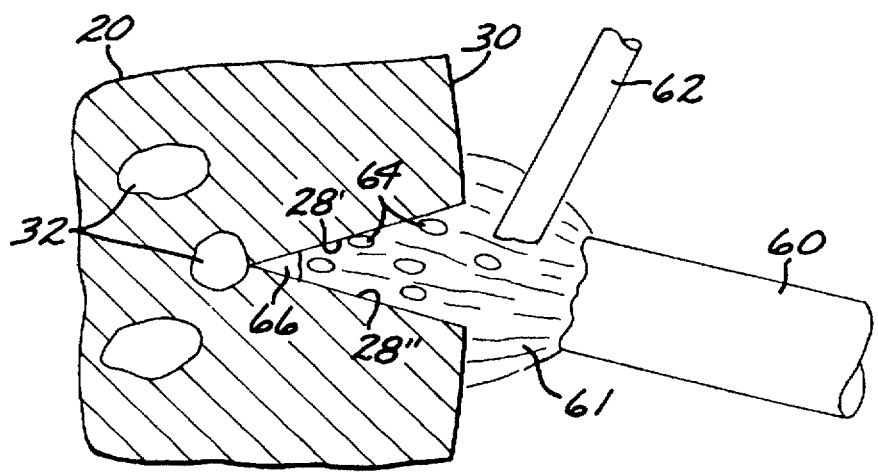
Figure 6:
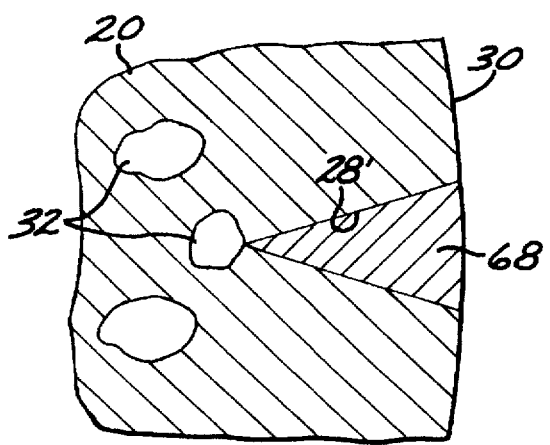

FIG. 3 is a block diagram of a process for repairing the article of FIG. 1, according to the invention;

FIG. 4 is an enlarged sectional view like that of FIG. 2, after removing foreign matter;

FIG. 5 is an enlarged sectional view like that of FIGS. 2 and 4, during welding;

FIG. 6 is an enlarged sectional view like that of FIGS. 2, 4, and 5, after welding is complete; and FIG. 7 is an elevational view of two articles welded together by the approach of the invention.

DETAILED DESCRIPTION OF THE INVENTION

FIG. 1 depicts an article that is a component of a gas turbine engine such as a turbine blade or turbine vane, and in this case a low-pressure turbine blade article 20, made of a gamma titanium aluminide alloy. Other gas turbine components made of a gamma titanium aluminide alloy can benefit from the welding approach of the invention, such as, for example, bearing supports, compressor casings, high pressure and low pressure hangars, frames, and low pressure turbine brush seal supports. Components of other systems such as, for example, automotive valves and superchargers may also be made of gamma titanium aluminide alloys.

The turbine blade 20 includes an airfoil 22 against which the flow of hot exhaust gas is directed. The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24.

As used herein, "gamma titanium aluminide" articles are those having compositions capable of forming the gamma ($\gamma$) titanium aluminide phase found generally at, slightly below, and slightly above the equiatomic composition in the titanium-aluminum system and in titanium-aluminum-X systems. (All compositions herein are stated in atomic percent unless indicated to the contrary.) Other phases such as the alpha-two ($\alpha$-2) and/or the beta-two ($\beta$-2) phases may also be present, preferably in relatively small amounts. Although the composition is based upon the titanium-aluminum system, alloying additions X (such as chromium and niobium) are provided in some gamma titanium aluminide alloys to modify and improve the properties for specific applications. The gamma titanium aluminide alloys of most interest are multiphase systems comprising predominantly gamma phase, but also containing lesser amounts of alpha-two, beta-two, and laves phases. The gamma titanium aluminide alloys preferably have from about 42 to about 49 atomic percent aluminum, balance titanium and, optionally, other alloying elements X. However, the gamma phase field extends up to about 70 atomic percent aluminum, and such alloys are also considered gamma titanium aluminides.

Examples of operable gamma titanium aluminide alloys for use with the present invention include alloys having compositions, in atomic percent, of 48 percent aluminum, 2 percent chromium, 2 percent niobium, balance titanium totalling 100 atomic percent (known as "Ti-48Al-2Cr-2Nb"); 47 percent aluminum, 2 percent niobium, 2 percent manganese, balance titanium totalling 100 atomic percent, plus 0.8 volume percent titanium diboride (known as "TiXD"); and 47.15 aluminum, 1.9 percent chromium, 0.8 percent niobium, 1.85 percent tantalum, balance titanium totalling 100 atomic percent (known as "NCG359").

According to conventional processing, the article such as the turbine blade 20 is cast from molten metal, as by consumable arc casting, into a mold, typically an investment casting mold. The cast article is cooled to ambient temperature. As a result of the casting operation, a casting defect 28 is present at a surface 30 of the blade 20. (The present approach is applicable to other types of defects as well.)

FIG. 2 illustrates the casting defect 28 in greater detail. In this case, the defect 28 is a large crack or opening extending inwardly toward the interior of the blade 20. The article also typically has interior porosity 32 resulting from the facts that the outer portion of the article solidifies first against the mold wall, and that the center portions of the article thereafter experience externally constrained shrinkage upon solidification that results in cavities and porosity. The interior porosity, or shrinkage cavity, may be entirely interior to the article or may be connected to the surface through the defect 28.

FIG. 3 depicts the approach of the invention, as applied to such an article. The article 20, made of the gamma titanium aluminide alloy, and with the defect 28 and the interior porosity 32, is provided, numeral 40. Any foreign matter is removed, numeral 42, from a preselected region of the article to be welded, in this case the region of the defect 28. The foreign matter is typically one of two types. The foreign matter may be pieces of material of another composition, such as ceramic particles from the investment casting mold, that have adhered to the inside surfaces of the defect 28. The foreign matter may also be a chemical contaminant. To remove the pieces of material of another composition, some of the material found at the surface of the area to be welded is removed, preferably by grinding as with a rotary grinder. In the case of the weld repair of the defect shown in FIG. 2, material inside the defect 28 is removed by grinding or other technique, enlarging the width of the defect as shown at groove 28' in FIG. 4. The groove 28' is preferably at least two times, or even three times, the width of the original defect 28, ensuring that particles of foreign matter are removed. To remove the chemical contaminants, the surfaces of the defect 28 (if no grinding is performed) or the groove 28' (if grinding is performed) are cleaned in a suitable cleaning agent. Preferably, for the gamma titanium aluminide alloy the cleaning is performed by immersion for 2-3 hours in an aqueous solution of 10 percent potassium hydroxide and 10 percent hydrogen peroxide.

After the foreign matter is removed, the article is first stress relieved prior to welding by heating to a suitable stress relieving temperature, numeral 44. The stress relieving temperature is preferably from about 1700° F. to about 2100° F. For the most preferred Ti-48Al-2Cr-2Nb gamma titanium aluminide alloy, the stress relieving temperature is about 1800° F. The stress relieving is preferably performed in the weld chamber in an inert atmosphere with a dewpoint of less than −80° F., and an oxygen content of less than 1 part per million produced by a nickel train heated to 1600° F. After stress relieving for an operable period of time, about 2 hours, the article is cooled from the stress relieving temperature at a relatively slow rate of less than about 400° F. per hour to a temperature of about 1200° F., prior to starting the weld repair. These numerical values are typical, inasmuch as the required cooling rate may be slower for large articles. The first stress relieving treatment is intended to reduce residual stresses that might otherwise cause defect enlargement during welding.

The temperature of the entire article is stabilized at a welding temperature, numeral 46. The welding temperature range is preferably from about 1000° F. to about 1400° F. For the most preferred Ti-48Al-2Cr-2Nb gamma titanium aluminide alloy, the nominal welding temperature is about 1200° F. The welding is performed in the welding apparatus under a high-purity atmosphere of an inert gas such as argon. Care is taken to maintain the oxygen content at less than about 1 part per million (ppm), because residual oxygen strongly oxidizes the hot and molten gamma titanium aluminide alloy material, to reduce the weld quality. For the same reason, the moisture content of the argon gas is maintained very low, with a dew point of less than about −80° F. The oxygen and moisture contents may be maintained at these low levels by passing the inert gas through a nickel-train gas purifier operated at 1600° F. before it enters the welding chamber, and continuously monitoring the oxygen content of the argon gas.

The welding chamber is preferably a resistance-heated oven operated in a glove box at one atmosphere of the inert gas processed as just described to achieve high purity. The interior of the welding oven is preheated prior to the start of the first stress relieving step 44 to outgas oxygen, moisture, and other residual gases.

The welding process is performed, numeral 48. FIG. 5 illustrates a preferred approach. A tungsten electrode 60 is positioned adjacent to the region to be welded, here the groove 28'. An electrical current is passed between the electrode 60 and the article 20 to form an arc 61, with the highest current density passing through the area of the groove 28'. The current is adjusted so that the sides of the groove 28' become molten, as indicated at numeral 28". The objective is to locally melt the gamma titanium aluminide material of the article 20, just in the area to be welded, here the groove 28' earlier ground into the region of the defect 28. This objective is readily accomplished by skilled welders or automated welding equipment.

At the same time, a filler metal is provided. Preferably, a weld rod 62 of filler metal is provided, having been previously cleaned by the same chemical cleaning procedure described in relation to step 42. The weld rod 62 is slowly fed and introduced into the arc 61, as shown in FIG. 5, so that droplets 64 of the filler metal are melted off the end of the rod 62 to form a filler pool 66 in the interior of the groove 28'. The filler metal 66 and the molten gamma titanium aluminide 28" mix together. The electrode 60 and rod 62 are moved longitudinally along the length of the groove 28' (i.e., movement out of the plane of the drawing in FIG. 5), with the rate of movement and the current of the arc 61 selected so that a sufficient amount of filler metal is melted into the groove 28' to fill it. As the electrode 60 and rod 62 move, the melted material behind this welding metal source cools and solidifies, leaving a weldment 68 filling what was previously the groove 28', as shown in FIG. 6. The weldment 68 is strongly bonded to the groove region 28' of the article 20, because of the care taken to remove foreign matter, the care taken to maintain a high-purity welding atmosphere, and the intermixing and fusion of the filler metal and the base material of the article 20.

The filler metal of the weld rod 62 may be any suitable metal. However, it is preferred that the filler metal be of the substantially same composition as the gamma titanium aluminide of the article 20, so that there is a match of chemical and physical properties in the repaired region.

After the welding 48 is complete, the article 20, with the weldment 68 in place, is preferably second stress relieved, numeral 50, by heating to a second stress relieving temperature. The second stress relieving temperature is preferably from about 1700° F. to about 2100° F., and is ordinarily the same temperature as used for the first stress relieving 44. For the most preferred Ti-48Al-2Cr-2Nb gamma titanium aluminide alloy, the stress relieving temperature is about 1800° F. The stress relieving is performed in the welding oven with the same atmosphere as described previously for the welding operation. After stress relieving for an operable period of time, about 1 hour, the article is cooled from the stress-relieving temperature at a relatively slow rate of less than about 400° F. per hour to a temperature of less than about 400° F., in order to minimize the re-introduction of internal residual stresses in the article. These numerical values are typical, inasmuch as the required cooling rate may be slower for large articles in order to avoid further cracking. The second stress relieving treatment is necessary for all welding operations in order to reduce post-weld residual stresses.

It is preferred that the steps 44, 46, 48, and 50 be conducted in a single apparatus, the welding apparatus, which has an oven with the capability to heat and cool as indicated. Performing these steps in a single apparatus avoids oxidation and possible contamination that could occur in moving the article from one apparatus to another.

The present approach to the welding of gamma titanium aluminide articles largely eliminates cracking during and after the welding operation due to residual stresses and non-uniform expansion and contraction of large, complex components. A further advantage of the present approach is that no hot isostatic pressing is required to accomplish the welding. Hot isostatic pressing may be used to close the porosity 32, either prior to the welding operation or after the welding operation is complete, but it is not part of the welding operation itself. The welding apparatus may therefore be relatively conventional and non-complex.

Welding according to the present approach has been described in terms of weld repair of articles 20 with defects therein. However, as illustrated in FIG. 7, it may also be used to weld together two different articles 20a and 20b. The same steps as described previously are preferably used, resulting in weldments 68a and 68b.

This invention has been described in connection with specific embodiments and examples. However, those skilled in the art will recognize various modifications and variations of which the present invention is capable without departing from its scope as represented by the appended claims.

What is claimed is:

1. A method of welding a gamma titanium aluminide alloy, comprising the steps of furnishing an article made of a gamma titanium aluminide alloy; thereafter removing any foreign matter present in a preselected region of the article to be welded; thereafter bringing the article to a welding temperature; thereafter stabilizing the temperature of the entire article at the welding temperature; thereafter welding the preselected region of the article, in an inert atmosphere, at the welding temperature; and thereafter, stress relieving the article.

2. The method of claim 1, wherein the step of furnishing includes the step of furnishing a gamma titanium aluminide having a composition, in atomic percent, selected from the group consisting of 48 percent aluminum, 2 percent chromium, 2 percent niobium, balance titanium totalling 100 atomic percent; 47 percent aluminum, 2 percent niobium, 2 manganese, balance titanium totalling 100 atomic percent, plus 0.8 volume percent titanium diboride; and 47.15 aluminum, 1.9 percent chromium, 0.8 percent niobium, 1.85 percent tantalum, balance titanium totalling 100 atomic percent.

3. The method of claim 1, wherein the step of removing includes the step of removing foreign matter from the preselected region by grinding away material around the preselected region.

4. The method of claim 1, wherein the step of removing includes the step of chemically cleaning the preselected region.

5. The method of claim 1, including an additional step, after the step of removing and before the step of stabilizing, of first stress relieving the article.

6. The method of claim 1, including an additional step, after the step of removing and before the step of stabilizing, of stress relieving the article at a temperature of from about 1700° F. to about 2100° F.

7. The method of claim 1, wherein the step of stabilizing includes the step of stabilizing the article at a temperature of from about 1000° F. to about 1400° F.

8. The method of claim 1, wherein the step of welding includes the step of striking an arc in the preselected region so as to locally melt the alloy in the preselected region.

9. The method of claim 1, wherein the step of welding includes the step of providing a filler metal having substantially the same composition as the gamma titanium aluminide alloy of the article.

10. The method of claim 1, wherein the step of stress relieving the article includes the step of stress relieving the article at a temperature of from about 1700° F. to about 2100° F.

11. The method of claim 1, wherein there is no step of hot isostatic pressing at any time in the processing.

12. A method of welding a gamma titanium aluminide alloy, comprising the steps of furnishing an article made of a gamma titanium aluminide alloy; thereafter removing any foreign matter present in a preselected region of the article to be welded; thereafter first stress relieving the article at a temperature of from about 1700° F. to about 2100° F.; thereafter bringing the article to a welding temperature of from about 1000° F. to about 1400° F.; thereafter stabilizing the temperature of the entire article at the welding temperature thereafter welding the preselected region of the article, in an inert atmosphere, at the welding temperature; and thereafter second stress relieving the article at a temperature of from about 1700° F. to about 2100° F.

13. The method of claim 12, wherein the step of furnishing includes the step of furnishing a gamma titanium aluminide having a composition, in atomic percent, selected from the group consisting of 48 percent aluminum, 2 percent chromium, 2 percent niobium, balance titanium totalling 100 atomic percent; 47 percent aluminum, 2 percent niobium, 2 manganese, balance titanium totalling 100 atomic percent, plus 0.8 volume percent titanium diboride; and 47.15 aluminum, 1.9 percent chromium, 0.8 percent niobium, 1.85 percent tantalum, balance titanium totalling 100 atomic percent.

14. The method of claim 12, wherein the step of providing includes the step of providing a filler metal having substantially the same composition as the gamma titanium aluminide alloy of the article.

15. The method of claim 12, wherein the step of removing includes the step of removing foreign matter from the region of a crack in the article by grinding away material around the crack.

16. The method of claim 12, wherein the step of removing includes the step of removing foreign matter from the region of a crack in the article by grinding away material around the crack to a width of at least about 2 times the width of the crack.

17. The method of claim 12, wherein the step of removing includes the step of chemically cleaning the preselected region.

18. The method of claim 12, wherein the step of welding includes the steps of striking an arc in the preselected region so as to locally melt the alloy in the preselected region, providing a filler metal, and feeding the filler metal into the arc so that the filler metal is melted and fused with the article.

19. A method of welding a gamma titanium aluminide alloy, comprising the steps of furnishing an article made of a gamma titanium aluminide alloy; thereafter removing any foreign matter present in a preselected region of the article to be welded, wherein the step of removing includes the steps of grinding away material in the preselected region, and chemically cleaning the preselected region; thereafter first stress relieving the article at a temperature of from about 1700° F. to about 2100° F.; thereafter bringing the article to a welding temperature of from about 1000° F. to about 1400° F.; thereafter stabilizing the temperature of the entire article at the welding temperature; thereafter welding the preselected region of the article, in an inert atmosphere, at the welding temperature, the step of welding including the steps of striking an arc in the preselected region so as to locally melt the alloy in the preselected region, providing a filler metal having the same composition as the gamma titanium aluminide alloy of the article, and feeding the filler metal into the arc so that the filler metal is melted and fused with the article; and thereafter second stress relieving the article at a temperature of from about 1700° F. to about 2100° F.

* * * * *